United States Patent [19]

Brendle

[11] 4,170,564
[45] Oct. 9, 1979

[54] REFRIGERANTS COLORED FOR LEAK INDICATION WITH SUBSTITUTED ANTHRAQUINONE DYES

[75] Inventor: Ralph N. Brendle, Inman, S.C.

[73] Assignee: Milliken Research Corporation, Spartanburg, S.C.

[21] Appl. No.: 839,850

[22] Filed: Oct. 6, 1977

[51] Int. Cl.² .............................................. C09K 5/04
[52] U.S. Cl. ...................................... 252/68; 260/379
[58] Field of Search ........................... 252/68; 280/379

[56] References Cited

U.S. PATENT DOCUMENTS

| | | | |
|---|---|---|---|
| 2,383,236 | 8/1945 | Buckley et al. | 260/379 |
| 3,449,319 | 6/1969 | Kuhn | 260/379 X |
| 3,770,640 | 11/1973 | Bartlett | 252/68 |
| 4,137,243 | 1/1979 | Farmer | 260/378 |

Primary Examiner—Harris A. Pitlick
Attorney, Agent, or Firm—H. William Petry

[57] ABSTRACT

Refrigerants, refrigeration oils and refrigerant-refrigeration oil mixtures containing a substantially hydrophobic polyoxypropyleneamine substituted anthraquinone dyes having the structure

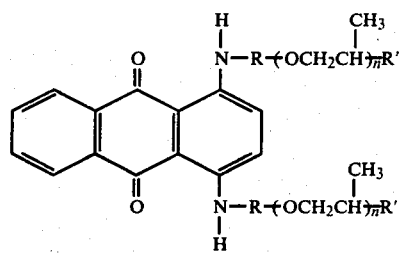

wherein R is an alkylene moiety containing at least 1 carbon atom, R' is a member of the group consisting of $NH_2$, OH, NCOR", OCOR" and OR" wherein R" is an alkyl moiety containing from 1 to about 18 carbon atoms, and wherein n is an integer having an average of at least about 6.

12 Claims, No Drawings

REFRIGERANTS COLORED FOR LEAK INDICATION WITH SUBSTITUTED ANTHRAQUINONE DYES

BACKGROUND OF THE INVENTION

1. Field of the Invention

This invention relates to refrigerants, refrigeration oils and refrigerant-refrigeration oils colored with substantially hydrophobic polyoxypropyleneamine substituted anthraquinone dyes. Such substantially hydrophobic polyoxypropyleneamine substituted anthraquinone dyes can readily be incorporated in vapor compression heat transfer systems, such as refrigeration systems employing fluorocarbon refrigerants and refrigeration oils, so that escaping refrigerant and/or oil containing dissolved dye can be easily visible thereby facilitating recognition and location of leaks in the system. Once such leaks have been located they can be readily repaired.

2. Description of Prior Art

The location of leaks in vapor compression heat transfer systems, such as refrigeration systems employing fluorocarbon refrigerants and refrigeration oils, has long been recognized as a difficult problem in the repair of such systems. Various dyes have been employed to indicate the presence and location of leaks in vapor compression heat transfer systems. However, such prior art dyes have generally lacked certain desired properties. For example, many of the dyes heretofore employed have possessed inadequate solubility in refrigerants and/or refrigeration oils, are often too unstable for use at the temperatures encountered in modern refrigeration systems, or severely stain certain finishes, such as acrylic finishes used on automobiles, thus making it impractical to use refrigerants containing such dyes.

It has now been discovered that by incorporating substantially hydrophobic polyoxypropyleneamine substituted anthraquinone dyes into fluorocarbon refrigerants, refrigeration oils and mixtures thereof, leaks in a vapor compression heat transfer system can readily be detected. Further, such substantially hydrophobic polyoxypropyleneamine substituted anthaquinone dyes are stable at temperatures normally encountered in refrigeration systems in the presence of fluorinated refrigeration oils and materials of construction; do not interfere with the normal operation of such a heat transfer system; and, are easily removed from materials, such as clothing, automobile finishes and refrigeration cabinets by the use of dry cleaning solvents.

SUMMARY OF THE INVENTION

According to the present invention, I have discovered a composition comprising a fluorocarbon refrigerant, a refrigeration oil, mixtures of such refrigerant and refrigeration oil, and a substantially hydrophobic polyoxypropyleneamine substituted anthraquinone dye or mixture of such dyes having the structure

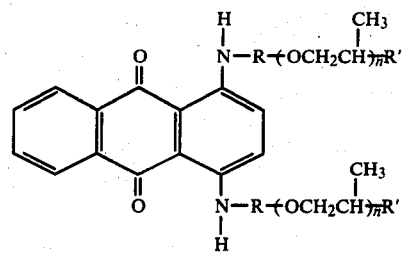

wherein R is an alkylene moiety containing at least 1 carbon atom, R' is a member of the group consisting of $NH_2$, OH, NCOR'', OCOR'' and OR'' wherein R'' is an alkyl moiety containing from 1 to about 18 carbon atoms, and wherein n is an integer having an average value of at least about 6, said substantially hydrophobic polyoxypropyleneamine substituted anthraquinone dye being soluble in the refrigeration liquids, the concentration of said dye being at least about 0.01 gram per 100 cc of the refrigeration liquid at 77° F.

Further, according to the invention, a process for indicating leaks in a vapor compression heat transfer system is provided which comprises circulating through the system a composition as described above.

DESCRIPTION OF THE INVENTION

The present invention is directed to a composition useful in the detection of leaks occurring in vapor compression heat transfer systems. Broadly, the composition comprises a refrigeration liquid and at least about 0.01 grams of a dissolved, substantially hydrophobic polyoxypropyleneamine substituted anthraquinone dye per 100 cc of refrigeration liquid at 77° F. Especially desirable results can be obtained when said composition contains from about 0.15 to about 1.29 grams of such dye per 100 cc of the refrigeration liquid. The term "refrigeration liquid" as used herein is to be understood to means a fluorocarbon refrigerant, a refrigeration oil, or a mixture of fluorocarbon refrigerant and refrigeration oil.

Useful fluorocarbon refrigerants include
trichlorofluoromethane,
dichlorodifluoromethane,
chlorodifluoromethane,
1,1,2-trichloro-1,2,2-trifluoroethane,
1,2-dichloro-1,1,2,2-tetrafluoroethane,
1,1-difluoroethane/dichlorodifluoromethane azeotrope (U.S. Pat. No. Re. 2,479,259, 23,358),
chloropentafluoroethane/chlorodifluoromethane azeotrope (U.S. Pat. No. 2,641,579),
chlorotrifluoromethane,
chlorotrifluoromethane/trifluoromethane azeotrope (British Pat. No. 1,063,416),
bromotrifluoromethane,
trifluoromethane,
chloropentafluoroethane,
difluoromethane/chloropentafluoroethane azeotrope (British Pat. No. 1,026,336),
chloropentafluoroethane/1,1-difluoroethane azeotrope (U.S. Pat. No. 2,641,580),
dichlorofluoromethane,
dichlorodifluoromethane/chlorofluoromethane azeotrope (British Pat. No. 1,218,917),
chlorofluoromethane/1,2-dichlorotetrafluoroethane azeotrope (U.S. Pat. No. 3,505,232),
difluoromethane, 1,2-dibromotetrafluoroethane,
1,1,1-trifluoroethane,
1,1-difluoro-1-chlorethane,
1,1-difluoroethane,
bromotrifluoromethane/difluoromethane azeotrope (U.S. Pat. No. 3,418,242),
1,2-dichlorotetrafluoroethane/dichlorofluoromethane azeotrope (U.S. Pat. No. 2,630,686), and
hexafluoroethane/trifluoromethane azeotrope (Hadley et al. Journ. Amer. Chem. Soc. 62 3302 (1940)).

Especially desirable results can be obtained when the fluorocarbon refrigerant is
trichlorofluoromethane
dichlorodifluoromethane,
chlorofluoromethane,
1,1,2-trichloro-1,2,2-trifluoroethane,
1,2-dichloro-1,1,2,2-tetrafluoroethane,
1,1-difluoroethane/dichlorodifluoroethane azeotrope, or
chloropentafluoroethane/chlorodifluoromethane azeotrope Useful refrigeration oils include any of the oils which are well known in the art and are commonly used in heat transfer apparatus, e.g., naphthenic oils, paraffinic oils, alkylated benezene oils and polyalkyl silicate oils. Useful illustrative oils include for example

| Trade Name | Oil Type | Manufacturer |
|---|---|---|
| "Suniso" 3GS | Naphthenic | Sun Oil Co. |
| "Suniso" 4GS | " | " |
| "Suniso" 5GS | " | " |
| "Capella" D | " | Texaco Oil Co. |
| "Delco" 15-117 | Paraffinic | " |
| GE (General Electric) Oil | " | " |
| "Zerice" S-41 | Alkylated Benzene | Humble Oil Co. (France). |
| "Fluicil" S-55K | Polyisobutyl Silicate | Farbenfabriken Bayer A.G. |

When the refrigeration liquid is a mixture of fluorocarbon refrigerant and refrigeration oil, the ratio of one to the other is not critical; however, about 1:1 weight ratio is generally employed.

The substantially hydrophobic polyoxypropyleneamine substituted anthraquinone dyes, including mixtures of such dyes, which are useful in the present invention have the structure

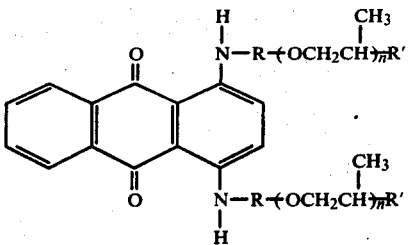

wherein R is an alkylene moiety containing at least 1 carbon, R' is a member of the group consisting of $NH_2$, OH, OCOR'', NCOR'', and OR'' wherein R'' is an alkyl moiety containing from 1 to about 18 carbon atoms, and wherein n is an integer having an average value of at least about 6. As previously stated, R' can be NCOR'', OCOR'', or OR'' wherein R'' is an alkyl moiety containing from 1 to about 18 carbon atoms. Thus, R'' can be methyl, ethyl, hexyl, octyl, decyl, dodecyl, octadecyl and the like. However, especially desirable results can be obtained when n has an average value of from about 16 to about 35, R is an alkylene moiety containing from 1 to about 4 carbon atoms, such as methylene, ethylene, propylene, isopropylene, butylene, and the like, and R'' is $NH_2$.

The dyes useful in the present invention may be prepared by reducing quinizarin with an aqueous admixture of sodium hydroxide and sodium hydrosulfite and thereafter reacting the resulting reduction product with polyoxypropyleneamines. Thereafter, the reaction product is oxidized with air to provide the dyes having the before-described structure. To further illustrate the preparation of the dyes useful in the present invention the following series of reactions are set forth.

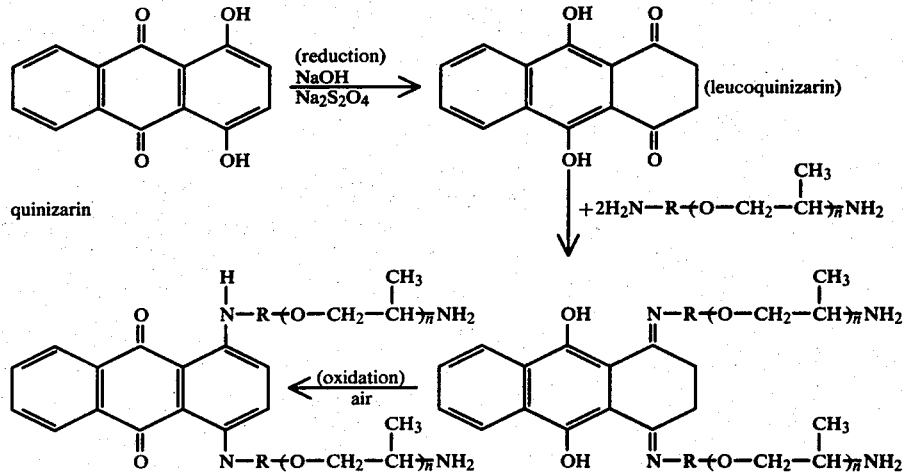

In the series of reactions depicted above, R is an alkylene moiety containing at least 1 carbon atom and n is an integer having an average value of at least about 6. Further, the condensation reaction between the leucoquinizarin and the polyoxypropyleneamine is carried out at a pH level of at least about 4, at atmospheric pressure and at a temperature in the range of from about 35° C. to about 135° C. More specific details of the preparation of the hydrophobic polyoxypropyleneamine substituted anthraquinone dyes are set forth in the following preparation.

The term "substantially hydrophobic" as used herein is to be understood to mean compounds in which the solubility of water is less than about 10%.

Preparation of Polyoxypropyleneamines Substituted Anthraquinone Dyes 15 parts water, 4.5 parts quinizarin (1,4-dihydroxyanthraquinone), and 1.5 parts 50% NaOH are charged to the reactor and are allowed to mix thoroughly. In a separate mixing vessel, 4 parts sodium hydrosulfite are dissolved in 16 parts water, and the aqueous hydrosulfite solution is slowly charged to the reactor containing the quinizarin. A nitrogen atmosphere is established as the hydrosulfite solution is added, and is maintained through the condensation to prevent oxidation of the unreacted leucoquinizarin.

After a 30 minute post stir period, 75 parts of "Jeffamine" D-2000* is charged to the reactor at a constant rate, re-establishing the nitrogen blanket after the addition. The temperature is raised to 95° C. and the condensation reaction is allowed to proceed for six hours.

*"Jeffamine" D-2000—a polyoxypropyleneamine represented by the structure

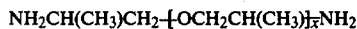

NH₂CH(CH₃)CH₂-[OCH₂CH(CH₃)]ₓ-NH₂ wherein x has an average approximate value of 33.1 manufactured by Jefferson Chemical Company, Inc., Houston, Texas.

The nitrogen blanket is then ended, the temperature reduced to 85° C., and an air sparge is initiated to facilitate the oxidation. The length of the oxidation reaction depends upon the conditions, but completion is verified by a change of color of the reaction mixture from greenish-blue to reddish-blue.

Once the reaction has gone to completion, water is charged to reduce the solids in the reaction mixture to 65% and the water layer is removed. Residual water is stripped by vacuum techniques. The final product is a thick reddish-blue liquid.

The water-insoluble polyoxypropyleneamine substituted anthraquinone dyes previously described hereinbefore can be incorporated into a refrigeration system in several ways. For instance, the dye could be added to the system before charging of refrigerant and/or refrigeration oil. Also, the dye could be dissolved in the refrigerant, or the refrigeration oil, or in a mixture of the two before charging the system. In addition, when a system is found to be low in refrigerant, the dye can be added to the system using conventional techniques well known in the art, using either of the before-mentioned methods, so that upon circulation of the dye through the vapor compression heat transfer system leaks in such system can readily be detected. Further, the use of the compositions of the present invention do not hinder the effectiveness or use of the refrigerant and/or refrigerant and/or refrigeration oil.

In order to further illustrate the composition of the subject invention the following examples are set forth. However, it is to be understood that such examples are merely illustrative of the invention and not in limitation thereof. Further, unless otherwise indicated, all quantities are by weight.

EXAMPLE I

A substantially hydrophobic polyoxypropyleneamine substituted anthraquinone dye having the formula

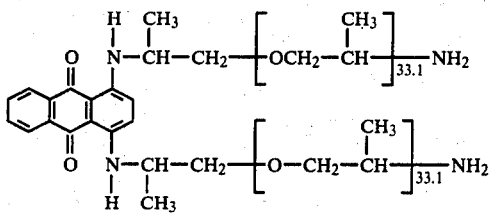

was prepared using the procedure set forth hereinbefore. A predetermined amount of the dye was then charged into a stainless steel cylinder equipped with a frit and paper filter at the exit tube. Fifty to 100 grams of refrigerant were then charged into the cylinder and the contents of the cylinder were allowed to equilibrate to the desired temperature. Thereafter, the cylinder was weighed to determine the amount of refrigerant charged, and the valve at the valve at the exit end of the cylinder was opened, discharging the refrigerant-dye solution through the filter into a tared beaker. After evaporation of the refrigerant and drying to remove condensed water, the residue was weighed to determine the amount of dissolved dye in a specific volume of refrigerant.

Such a procedure was followed to determine the solubility of the before-mentioned dye in various fluorinated refrigerants. The results of such are set forth in Table I.

Table I

Solubility of substantially hydrophobic polyoxypropyleneamine substituted anthraquinone dye in fluorinated refrigerants

| Refrigerant | Solubility (g/100cc of refrigerant) | |
|---|---|---|
| | 0° F. | 77° F. |
| Trichlorofluoromethane | 10.2 | 12.1 |
| Dichlorodifluoromethane | 1.0 | 3.8 |
| Chlorodifluoromethane | 7.1 | 10.7 |
| 1,1,2-trichloro-1,2,2-trifluoroethane | 1.4 | 6.5 |
| 1,2-dichloro-1,1,2,2-tetrafluoroethane | 0.31 | 0.9 |
| 1,1-difluoroethane/dichlorodifluoroethane | 3.3 | 7.3 |
| Chloropentafluoroethane/chlorodifluoromethane | 4.4 | 6.2 | chloride

EXAMPLE II

The solubility of the polyoxypropyleneamine substituted anthraquinone dye of Example I was measured in refrigeration oil. To be useful as a refrigeration oil, an oil must be stable at high temperatures on compression, must be compatible with refrigerant and have pour and flocculation points below the evaporator temperature. In addition, the refrigeration oil must possess a sufficiently high dielectric strength to insure insulation of an enclosed pump motor while possessing a sufficient viscosity to seal the valves and piston of the pump.

"Suniso" 3GS, a refrigeration oil manufactured by Sun Oil Company and commonly employed in vapor compression heat transfer systems, was employed to test the solubility of the dye of Example I in a refrigeration oil. Solubility of the dye was determined as follows:

An excess amount of the substantially hydrophobic polyoxypropyleneamine substituted anthraquinone dye of Example I was added to a volume of oil and the resulting admixture was stirred for 4 to 6 hours to insure complete saturation of the oil with the dye. The resulting admixture was then allowed to settle overnight and the dye saturated oil phase was then decanted off. Ten milliliters of the dye saturated oil was pipetted into a 100 milliliter volumetric flask and the remaining volume (90 milliliters) was made up with methylene chloride. The absorptivity of the dye was compared to a calibration chart made by dissolving known amounts of the dye in methylene chloride and plotting the absorptivities. With this chart, the amount of dye in the 10 milliliters of oil was determined. Such a measurement indicated that the solubility of the dye in the refrigeration oil was 1.29 g of dye/100 mls of oil. The chart used in this determination can be reproduced from the date in the table below.

Table II

| Absorptivity* | Solubility (g tint/100mls oil) |
|---|---|
| 0.25 | .110 |
| 0.50 | .210 |
| 0.75 | .310 |
| 1.00 | .412 |
| 1.25 | .515 |
| 1.50 | .620 |
| 1.75 | .720 |
| 2.00 | .822 |
| 2.25 | .925 |
| 2.50 | 1.028 |
| 2.75 | 1.130 |
| 3.00 | 1.232 |
| 3.25 | 1.335 |

*10 mls. saturated oil in 90 mls. methylene chloride

EXAMPLE III

The substantially hydrophobic polyoxypropyleneamine substituted anthraquinone dye of Example I was admixed with a liquid refrigerant and tested in a vapor compression heat transfer system. Three different types of commercially available liquid refrigerants were employed and the amount of dye was varied in each instance. Upon simulation of a leak in a line of the vapor compression heat transfer system, an unmistakable blue spot was created in the line where the leak was created. The blue spot was created because the dye is soluble in both the refrigeration oil and liquid refrigerant and when the leak occurred, all three components escaped creating a blue stain at the leak as the liquid refrigerant vaporized. Further, the use of the dye of Example I was found to have no adverse effects on refrigeration and air conditioning systems either by performance or upon the materials of construction.

The commercially available liquid refrigerants and concentration of the substantially hydrophobic polyoxypropyleneamine substituted anthraquinone dye employed in these experiments are tabulated in Table I hereinbelow.

| Liquid Refrigerant | | Concentration of Dye (g/100cc refrigerant) |
|---|---|---|
| Racon 12[(1)] | dichlorodifluoromethane$(CCl_2F_2)$ | 0.15 |
| Racon 22[(1)] | chlorodifluoromethane$(CHlF_2)$ | 0.18 |
| Racon 502[(1)] | azeotrope of chlorodifluoromethane and chloropentafluoroethane $(CHlF_2/CClF_2CH_3)$ | 0.18 |

[(1)]Commercially available liquid refrigerants manufactured by Racon Inc., Wichita, Kansas 67201.

That which is claimed is:

1. A leak detecting refrigeration composition for vapor compression heat transfer systems consisting essentially of a refrigeration liquid and a minor effective amount of a substantially hydrophobic polyoxypropyleneamine substituted anthraquinone dye or mixture of such anthraquinone dyes having the structure

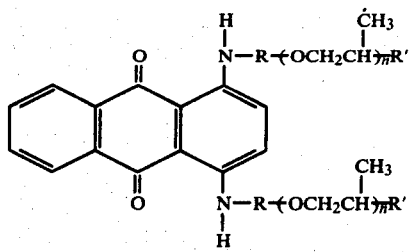

wherein R is an alkylene moiety containing at least 1 carbon atom, R' is a member of the group consisting of $NH_2$, OH, NCOR", OCOR", and OR" wherein R" is an alkyl moiety containing from 1 to about 18 carbon atoms, and wherein n is an integer having an average value of at least about 6, said substantially hydrophobic polyoxypropyleneamine substituted anthraquinone dye being soluble in said refrigeration liquid.

2. The leak detecting refrigeration composition of claim 1 wherein said minor effective amount of said substantially hydrophobic polyoxypropyleneamine substituted anthraquinone dye is at least about 0.01 grams of said dye per 100 cc of refrigeration liquid at 77° F.

3. The leak detecting refrigeration composition of claim 2 wherein said dye is present within said composition in an amount of from about 0.15 to about 1.29 grams of said dye per 100 cc of refrigeration liquid.

4. The leak detecting refrigeration composition of claim 1 wherein said refrigeration liquid is selected from the group consisting of a fluorocarbon refrigerant, a refrigeration oil, and mixtures of said fluorocarbon refrigerant and said refrigeration oil.

5. The leak detecting refrigeration composition of claim 4 wherein said fluorocarbon refrigerant is selected from the group consisting of trichlorofluoromethane, dichlorodifluoromethane, chlorofluoromethane, 1,1,2-trichloro-1,2,2-trifluoroethane, 1,2-dichloro-1,1,2,2-tetrafluoroethane, 1,1-difluoroethane/dichlorodifluoromethane azeotrope and chloropentafluoroethane/chlorodifluoromethane azeotrope.

6. The leak detecting refrigeration composition of claim 4 wherein said refrigeration liquid is a refrigeration oil.

7. The leak detecting refrigeration composition of claim 4 wherein the refrigeration liquid is a mixture of refrigeration oil and a fluorocarbon refrigerant, and wherein the weight ratio of refrigeration oil to fluorocarbon is about 1:1.

8. The leak detecting refrigeration composition of claim 4 wherein said substantially hydrophobic polyoxypropyleneamine substituted anthraquinone dye is represented by the structure

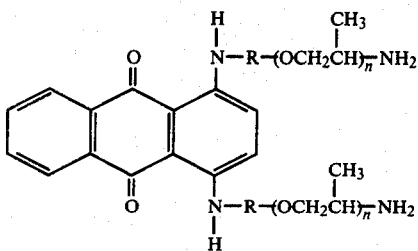

wherein R is an alkylene moiety containing from about 1 to about 4 carbon atoms, and n has an average value of from about 16 to about 35.

9. The leak detecting refrigeration composition of claim 8 wherein said substantially hydrophobic polyoxypropyleneamine substituted anthraquinone dye has the structure

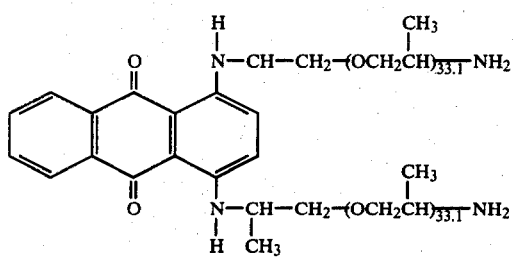

10. A method for detecting leaks in vapor compression heat transfer systems employing a refrigeration liquid consisting essentially of fluorocarbon refrigerants and/or refrigeration oils which comprises charging to said vapor compression heat transfer system an effective minor amount of a substantially hydrophobic polyoxypropyleneamine substituted anthraquinone dye or mixture thereof to sufficiently color the refrigeration liquid and allow one to visually detect a leak in the system due to the presence of the dye at the source of the leak, said dye having the formula

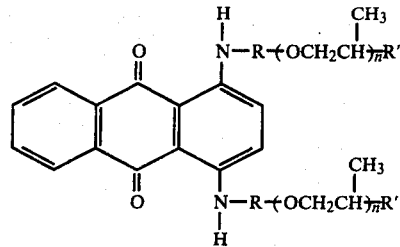

wherein R is an alkylene moiety containing at least 1 carbon atom, R' is a member of the group consisting of $NH_2$, OH, OCOR'', and OR'' wherein R'' is an alkyl moiety containing from 1 to about 18 carbon atoms, and wherein n is an integer having an average value of at least about 6.

11. The method according to claim 10 wherein said substantially hydrophobic polyoxypropyleneamine substituted anthraquinone dye is represented by the structure

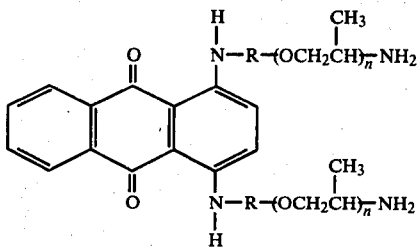

wherein R is an alkylene moiety containing from 1 to about 4 carbon atoms, n has an average value of from about 16 to about 35, and said dye is charged to the refrigeration liquid in an amount sufficient to provide a concentration of said dye in the refrigeration liquid of from about 0.01 to about 1.29 grams of said dye per 100 cc of refrigeration liquid at 77° F.

12. The method according to claim 11 wherein said substantially hydrophobic polyoxypropyleneamine substituted anthraquinone dye has the structure

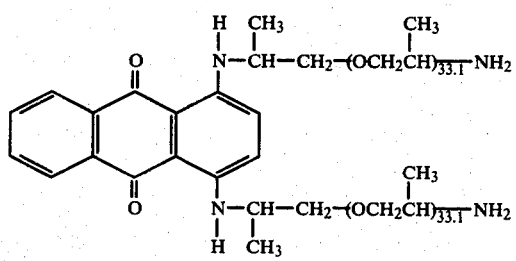

* * * * *

UNITED STATES PATENT OFFICE
CERTIFICATE OF CORRECTION

Patent No. 4,170,564     Dated October 9, 1979

Inventor(s) Ralph N. Brendle

It is certified that error appears in the above-identified patent and that said Letters Patent are hereby corrected as shown below:

Column 2, line 40, the word "means" should be --mean--.

Column 2, line 50, after the word "No." delete --Re.--.

Column 2, line 50, after "2,497,259," add --Re.--.

Column 6, line 44, delete "chloride".

Column 7, line 61, correct the formula "$(CHIF_2/CCIF_2CH_3)$" to --$(CHIF_2CCIF_2CF_3)$--.

Column 8, line 56, change the word "said" to --the--.

Signed and Sealed this

First Day of January 1980

[SEAL]

Attest:

SIDNEY A. DIAMOND

Attesting Officer     Commissioner of Patents and Trademarks